M. W. Costolo,

Belt Fastener,

№ 51,561.  Patented Dec. 19, 1865.

Witnesses;

Inventor;

UNITED STATES PATENT OFFICE.

MICHAEL W. COSTOLO, OF BOSTON, MASSACHUSETTS.

IMPROVED BELT-FASTENING.

Specification forming part of Letters Patent No. 51,561, dated December 19, 1865.

*To all whom it may concern:*

Be it known that I, MICHAEL W. COSTOLO, of Boston, in the county of Suffolk and State of Massachusetts, have invented a new and Improved Belt Hitch or Fastening; and I do hereby declare that the following is a full, clear, and exact description thereof, which will enable those skilled in the art to make and use the same, reference being had to the accompanying drawings, forming part of this specification, in which—

Figure 1:
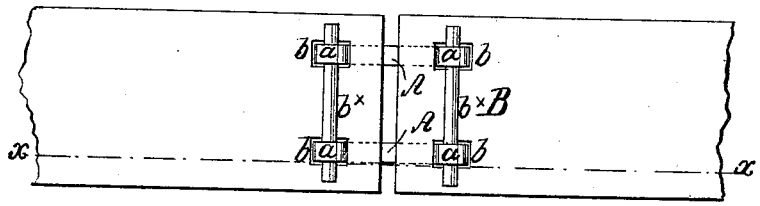
Figure 2:
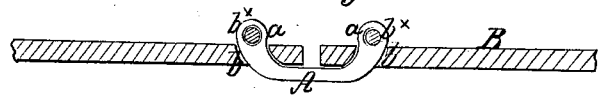

Figure 1 is an outer or face view of my invention applied to a belt; Fig. 2, a section of Fig. 1, taken in the line $x\ x$.

Similar letters of reference indicate corresponding parts.

This invention relates to a new and improved hitch or fastening for connecting together the ends of belts for driving machinery.

The object of the invention is to obtain a simple and efficient device which may be readily applied to a belt and admit of the same being readily taken up or tightened whenever required.

A A represent two short metal bars, the ends $a\ a$ of which are slightly curved, so that they may pass through holes $b$ made in the ends of the belt B.

These bars A A have a parallel position relatively with each other, and their ends $a\ a$ have holes drilled through them to admit of rods $b^\times$ being passed through at the side of the belt opposite to that where the ends $a\ a$ are inserted, the rods $b^\times$ connecting the bars A A, and also connecting the ends of the belt together.

The ends of the belt may be readily disconnected by removing the rods $b^\times$, and the belt taken up and shortened at any time, when necessary, by cutting off a portion of one end of the belt and making new holes therein for the ends of the bars A A to pass through.

I claim as new and desire to secure by Letters Patent—

The bars A A, curved at their ends and having holes drilled through them, in combination with the rods $b^\times\ b^\times$, all arranged and applied substantially as and for the purpose herein set forth.

MICHAEL W. COSTOLO.

Witnesses:
 HENRY O. ROBERTS,
 ELISHA BASSETT.